June 13, 1939.   H. CHRISMAN   2,162,375
MECHANICAL MOVEMENT
Filed June 13, 1935   2 Sheets-Sheet 1

INVENTOR.
HORACE CHRISMAN.
BY Lewis D. Konigsford
ATTORNEY.

June 13, 1939.  H. CHRISMAN  2,162,375
MECHANICAL MOVEMENT
Filed June 13, 1935  2 Sheets-Sheet 2

INVENTOR.
HORACE CHRISMAN.
BY
Lewis D. Kingsford
ATTORNEY.

Patented June 13, 1939

2,162,375

UNITED STATES PATENT OFFICE 2,162,375

MECHANICAL MOVEMENT

Horace Chrisman, Edgewood, Pa., assignor to Pittsburgh Equitable Meter Company, Pittsburgh, Pa., a corporation of Pennsylvania Application June 13, 1935, Serial No. 26,435

12 Claims. (Cl. 74—117)

This invention relates to a mechanical movement useful in general in any situation requiring a shaft to be rotated in varying ratio to its driving movement, and is especially applicable to measuring devices, for varying the driving ratio between the register and fluid actuated mechanism thereof. The invention will be described in connection with its use in a liquid meter, but it will be understood that the invention is not limited thereto.

The registers used in various fluid displacement meters commercially available are not ordinarily calibrated in accordance with the displacement of the meter. A gear transmission is usually employed between the meter and register, and by substituting gears of various ratios in said transmission it is possible to drive the register to approximately indicate the flow through the meter. However, this type of adjustment requires that a large stock of gears of various ratios be kept on hand, and further has the limitation that very close and accurate adjustment cannot be accomplished. Also in this construction the register will be driven in the same direction as the meter at all times.

One object of my invention is to provide a movement transmission between a meter and register which is very accurate and can be adjusted with precision to calibrate the meter with the register, or to adjust for fluctuations in price of the commodity measured, or for other purposes and which can be sealed in adjusted position.

Another object is the provision of a transmission which will drive the register in an ascending direction regardless of the direction of movement of the meter.

A further object is the provision of a transmission between a meter and register which is inexpensive to manufacture, adjustable and accurate, and which can be readily substituted in various types of meters now commercially available.

According to the present invention, the register drive shaft which is driven by the meter is given a periodically recurring rotation, the extent of rotation being adjustable within predetermined limits so that the indication of the register can be brought into exact correspondence with the flow through the meter.

In the preferred embodiment of my invention, I provide primary and secondary one way clutches in the transmission between the meter and register, said clutches preferably having a common driven member to which the register drive shaft is secured, said common driven member being positively driven from the meter through a primary clutch, and receiving a periodical overdrive through the secondary clutch. The overdrive can be imparted to said common member from any point moved eccentrically with respect to the center of one of said clutches, and in the preferred embodiment, is imparted to said common member from a crank and connecting link driven at a greater angular speed than the primary clutch. The preferred embodiment has the further advantage that the register will always be driven in an ascending direction regardless of the direction of flow through the meter. The primary and secondary one way clutches are preferably of the one way ball or roller friction type, as this type of clutch is signally free from error due to slippage and can be accurately adjusted. However, it will be understood that other suitable types of one way or friction drives may be employed in place thereof.

For a further detailed description of my invention, reference is made to the accompanying drawings wherein.

Figure 1:
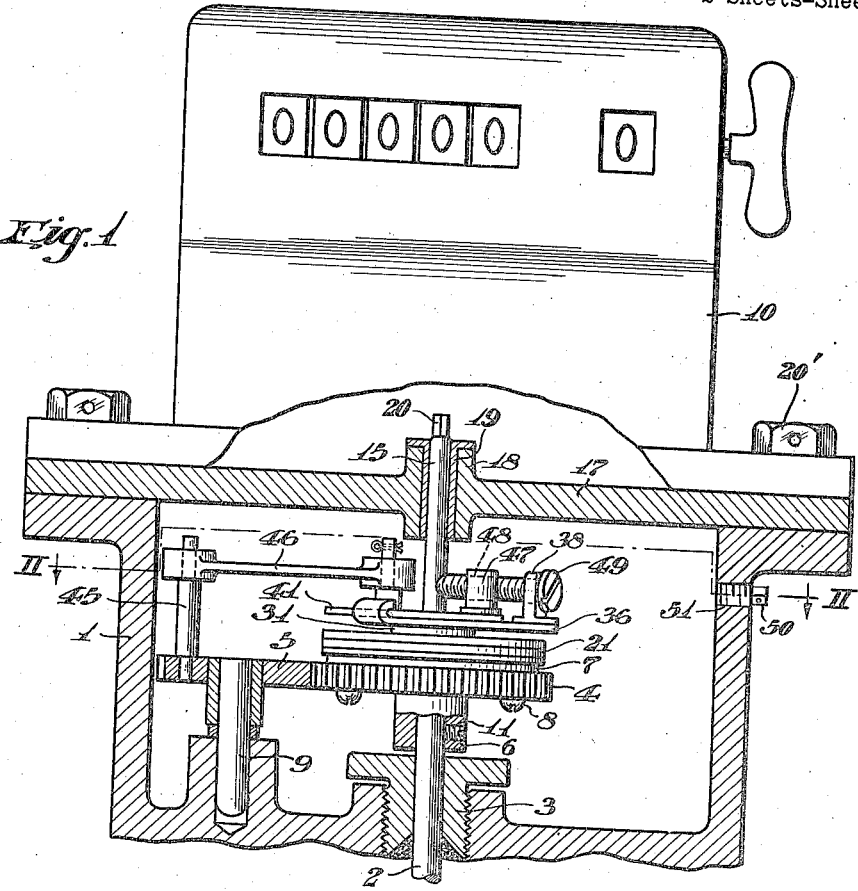
Figure 1 is a view partly in section of the preferred embodiment of my invention employed in combination with a meter and register.

Referring to the drawings, in Figure 1 there is shown a fragmentary section of a meter case 1 enclosing a metering mechanism of any suitable type (not shown) which drives a driving shaft 2 passing through a stuffing box 3 in the casing, a driving gear 4 being suitably mounted on the end of the shaft. The gear 4 drives a spur gear 5 which is secured on a stub shaft 9 journalled in any suitable manner in the casing 1. The gear 4 fits over the hub 6 of a table 7 and is secured to the table by machine screws 8 or any other suitable means, and the table 7 and gear assembly is secured to shaft 2 by a set screw 11.

Figure 4:
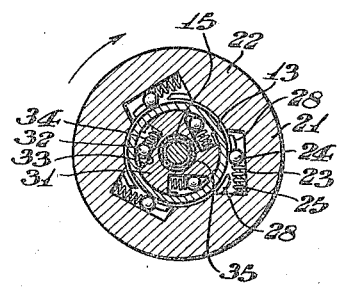
Figure 4 is a horizontal section taken on line IV—IV of Figure 3.
Figure 2:
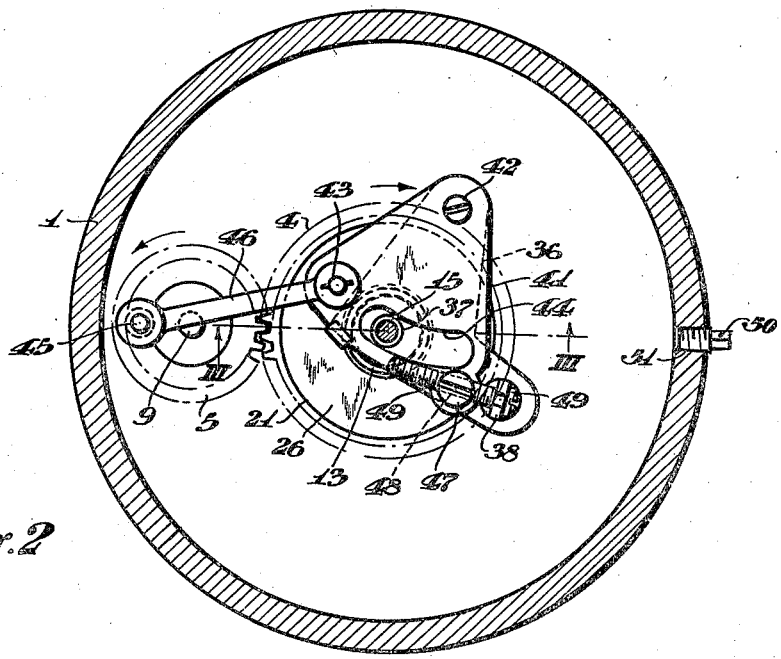
Figure 2 is a sectional view taken on line II—II of Figure 1.
Figure 3:
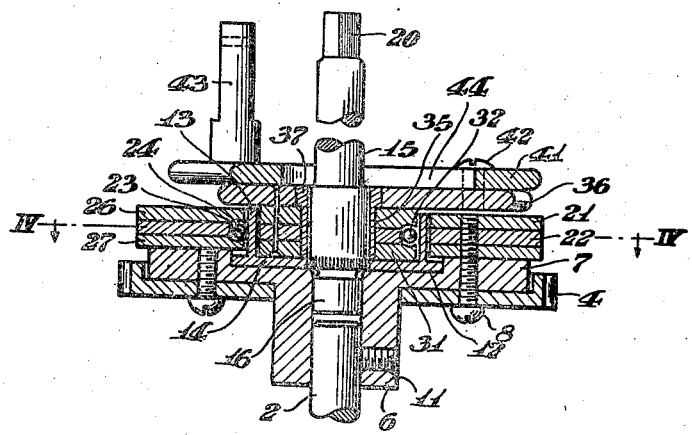
Figure 3 is a vertical section taken on line III—III of Figure 2.

The table 7 has a central depression 12 (Figure 3) which receives a clutch drum having a cylindrical clutch wall 13 and a circular head 14 to which is secured the enlarged fluted end of driven shaft 15, a reduced stub 16 thereof extending into and being journalled in hub 6. The other end of shaft 15 is journalled in any suitable manner in an intermediate plate 17 (Figure 1) which has a central hub 18 with a bushing 19 therein, the end of the shaft being squared as indicated at 20 and is adapted to be coupled by a coupling (not shown) to the register 10 suitably secured to the meter case by cap screws 20' having suitable holes in the heads thereof so they can be sealed by a wire and lead seal. The table 7 carries an exterior or primary one way grip clutch designated generally by the numeral 21 which is secured thereto by screws 8, and is arranged to drive the clutch drum 13 in the direction of rotation of shaft 2. The clutch is constructed in any suitable manner, and in the preferred embodiment comprises an annular disk 22 (Figure 4) having tangential recesses 23 in its inner periphery in which are located balls or rollers 24 of steel or other suitable material urged inwardly by springs 25 in the recesses. The balls and springs are covered by two similar annular cover plates 26 and 27, riveted or otherwise secured to the middle plate 22, and have turned in portions 28 at their inner peripheries which prevent the balls 24 from falling out of the recesses. The arrangement is such that when the primary clutch turns clockwise as seen in Figure 4, the balls 24 will grip the hardened clutch drum 13 so that the drum and shaft 15 will rotate in unison with shaft 2.

Within the drum 13 is a secondary similar one way clutch assembly designated generally by the numeral 31 and similarly constructed with balls or rollers 32 received in the tangential recesses 33 and urged outwardly by springs 34. The secondary clutch assembly 31 is freely rotatable on the driven shaft 15, and the arrangement of recesses and balls therein is such that when the drum 13 is driven by the outer clutch 21 the clutch drum 13 idles over the balls 32 of the secondary clutch.

A bushing 35 is secured to clutch member 31 in which shaft 15 is loosely rotatable, and the so-called fixed plate 36 of an adjustment mechanism is journalled snugly about the enlarged end 37 of bushing 35 and secured to the secondary clutch element by rivets or in any suitable manner. The plate 36 has a bifurcated lug 38 riveted or otherwise secured thereto. A second or movable adjustment plate 41 is superposed on the plate 36 and is pivoted thereto as by a screw 42. The second plate 41 carries a crank pin 43, and has an arcuate slot 44 through which extends the driven shaft 15. The gear 5, which is driven by spur gear 4, carries a crank pin 45, and a connecting link 46 has one end journalled thereon, the other end being journalled on the crank pin 43. The plate 41 carries a slit boss 47 which has an internally threaded bore 48 therethrough, and an adjustment screw 49 is threaded through the boss 47 and abuts the bifurcated lug 38 on the plate 36. Access to the screw 49 can be had for adjusting the drive by removing threaded plug 50 from the bore 51 in the casing and inserting a screw driver through the bore. The plug 50 can be sealed by passing a wire through a hole therein and through a cap screw 20', the wire being sealed by a lead seal.

The mode of operation will now be described. The meter shaft 2 drives the primary clutch 21, to which it is secured, in clockwise direction, and drum 13, to which the register driving shaft 15 is secured, is gripped and driven positively in clockwise direction by the wedging engagement of the clutch balls 24 of the primary clutch therewith. The gear 5 and the radius of crank pin 45 are smaller than gear 4 and are driven at a greater angular speed. Each time gear 5 makes a complete revolution the eccentric throw of crank pin 45 and link 46 oscillate the adjustment plates 36 and 41, which are secured to the secondary clutch 31, through a predetermined angle at a greater angular speed than primary clutch 21. Consequently, the balls 32 of the secondary clutch grip the clutch drum 13 through a portion of a cycle of oscillation and impart thereto an impulse at a greater velocity which causes an overdrive, and the register connected to shaft 15 is speeded up sufficiently to correct the error which otherwise would occur in the reading of the register. On the return cycle of the oscillation, the secondary clutch slips over the clutch drum, due to the automatic release of the balls 32.

When screw 49 is turned in one direction it spreads plates 36 and 41 about pivot pin 42 and thus shifts the distance between crank pin 43 and central shaft 15. Since the throw of crank pin 45 is fixed, this shifting varies the angle of oscillation of plate 36 and hence varies the angle of oscillation during which the overdrive is imparted to shaft 15. Hence, this adjustment shifts the overdrive and provides for rotating shaft 15 at any desired ratio with respect to shaft 2. Should the meter be reversed accidently, or to produce a fraudulent reading, the primary clutch 21 will not drive clutch drum 13, but the plates 36 and 41 will be oscillated by gear 5 in the same way as previously described, and secondary clutch 31 will advance the shaft 15 periodically during the gripping cycle of oscillation of the secondary clutch. Hence, the register will be intermittently driven in the same direction so that the reading of the register will not be reversed by reversing the direction of rotation of the meter.

Any suitable means may be employed to impart a rotary movement to the secondary clutch, and it will be apparent that an oscillating or reciprocating movement may be employed for this purpose. Also, the primary movement may be imparted to crank 45, and clutch 21 will become the secondary clutch. Further, the adjustment may be made in any suitable manner, as by varying the ratio between gears 4 and 5, by varying the throw of eccentric 43, or otherwise as desired.

The invention may be embodied in other specific forms without departing from the spirit or essential characteristics thereof. The present embodiment is therefore to be considered in all respects as illustrative, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a mechanical movement, a driving shaft, a driven shaft fixedly journalled and concentric therewith, a member rotated by the driving shaft, continuously rotated one-way drive means supported by said member and having a driving engagement with said driven shaft, a separate second one way drive means for imparting rotary impulses in one direction to said means, and means for intermittently actuating said second one way drive means, whereby said driven shaft is rotated by the faster moving one-way drive means.

2. In a mechanical movement, a driving shaft, a driven shaft concentric therewith, a plate rotated by the driving shaft, a clutch drum supported by said plate and having a driving engagement with said driven shaft, a one-way clutch for driving said clutch drum in one direction, a second one way clutch for imparting intermittent impulses in one direction to said clutch drum, and means for oscillating said second one way clutch, whereby said driven shaft is rotated by the faster moving one-way clutch.

3. In a mechanical movement, a driving shaft, a driven shaft fixedly journalled concentric therewith, a member rotated by the driving shaft, a clutch drum supported by said member and having a driving engagement with said driven shaft, a one-way clutch for driving said clutch drum in one direction, a separate second one way clutch for imparting intermittent impulses in one direction to said clutch drum, an eccentric driven by said driving shaft, and means connecting said eccentric and second one way clutch for oscillating said second one way clutch, whereby said driven shaft is rotated by the faster moving one-way clutch.

4. In a mechanical movement, a driving shaft, a driven shaft concentric therewith, a member rotated by the driving shaft, a clutch drum supported by said member and having a driving engagement with said driven shaft, a one way clutch member secured to said first member and having means engaging said clutch drum in one direction of rotation, a one way drive means for imparting intermittent driving impulses in one direction to said clutch drum, and means for oscillating said one way drive means, whereby said driven shaft is rotated by the faster moving one-way drive means.

5. In a mechanical movement, a driving shaft, a primary clutch member driven by said shaft, a clutch drum adapted to be driven in one direction by said clutch member, a second concentric clutch member adapted to engage said clutch drum for driving said drum in the same direction, the clutch drum being driven by the faster moving clutch member, a pin secured to said second clutch member, a gear on said driving shaft, a second gear meshing with said first gear, a crank pin driven by said second gear, a crank arm connecting said crank pins, and means for adjusting the eccentricity of the pin secured to said second clutch member.

6. In a mechanical movement, a one way clutch mechanism comprising an element to be gripped, a plurality of primary gripping elements adapted to grip and rotate said gripped element in one direction, means for rotating said primary gripping elements in one direction, a crank rotatable about an offset axis, means for driving said crank from said aforementioned means, a secondary clutch member adapted to grip and rotate said gripped element when rotated in gripping direction of the primary gripping elements means connecting said crank and secondary clutch for imparting thereto intermittent impulses in one direction, whereby said gripped element is rotated by the faster moving gripping element and means for adjusting the length of said impulses.

7. In a mechanical movement, a one way clutch member comprising a member adapted to be gripped, primary and secondary gripping members, a driving shaft for rotating said primary gripping member in one direction, a crank adapted to be driven by said shaft, an arm connecting said crank and connected to said secondary clutch member, whereby said gripped member is rotated by the faster moving gripping member and means for radially adjusting the point of connection between said arm and secondary clutch member.

8. In a mechanical movement, a driven fixedly journalled shaft, primary one way drive means to rotate said driven shaft, a drive shaft, means to rotate said primary means at the same speed as the drive shaft, secondary rotatable one way drive means, and rotatable means to oscillate said secondary one-way drive means to intermittently impart rotary overdrive impulses to said driven shaft.

9. In a mechanical movement, a driven shaft, releasable primary one way drive means to rotate said driven shaft, means to continuously rotate said primary means at a constant speed, releasable secondary rotatable one way drive means, and rotary means to oscillate said secondary one-way drive means to intermittently impart overdrive impulses to said driven shaft.

10. In a mechanical movement, a driven shaft, a releasable primary one way clutch to rotate said driven shaft, means to continuously rotate said primary clutch at a constant speed, a releasable secondary rotatable one way drive means, and rotary means to oscillate said secondary one-way drive means to intermittently impart overdrive impulses to said driven shaft.

11. In a mechanical movement, a driven member, a primary one-way clutch having means to grip and rotate said member in one direction, a secondary one-way clutch having means to grip said member when rotated in gripping direction of the primary clutch, a crank, common means to rotate said crank and primary one-way clutch, and a connecting rod between said crank and an eccentric point on the secondary clutch to oscillate said secondary clutch.

12. In a mechanical movement, a driven member, a primary one-way clutch having means to grip and rotate said member in one direction, a secondary one-way clutch having means to grip said member when rotated in gripping direction of the primary clutch, a crank rotated from the primary clutch, a connecting link between said crank and a point on the secondary one-way clutch to oscillate said secondary clutch, and means to adjust the radius of said point on the secondary clutch.

HORACE CHRISMAN.